United States Patent
Steiner et al.

(10) Patent No.: US 12,275,469 B2
(45) Date of Patent: Apr. 15, 2025

(54) TRACK SHOE ASSEMBLY INCLUDING A SHOE PLATE AND A GROUSER AND RELATED METHOD OF MANUFACTURE

(71) Applicant: Caterpillar Inc., Peoria, IL (US)

(72) Inventors: Kevin L. Steiner, Tremont, IL (US); Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 723 days.

(21) Appl. No.: 17/402,835

(22) Filed: Aug. 16, 2021

(65) Prior Publication Data
US 2023/0053156 A1 Feb. 16, 2023

(51) Int. Cl.
| B62D 55/26 | (2006.01) |
| B21B 15/00 | (2006.01) |
| B23K 9/025 | (2006.01) |
| B62D 55/28 | (2006.01) |

(52) U.S. Cl.
CPC .......... *B62D 55/26* (2013.01); *B21B 15/0007* (2013.01); *B23K 9/0256* (2013.01); *B62D 55/28* (2013.01)

(58) Field of Classification Search
CPC ........ B62D 55/26; B62D 55/28; B62D 55/27; B62D 55/275; B62D 55/286; B21B 15/0007; B23K 9/0256
See application file for complete search history.

(56) References Cited

U.S. PATENT DOCUMENTS

| 1,456,348 | A | * | 5/1923 | White | B62D 55/27 |
| | | | | | 305/191 |
| 2,202,309 | A | * | 5/1940 | Campbell | B62D 55/26 |
| | | | | | 280/28 |
| 3,058,783 | A | * | 10/1962 | Wadsworth | B62D 55/275 |
| | | | | | 305/51 |
| 3,899,220 | A | | 8/1975 | Grawey et al. | |
| 3,912,338 | A | * | 10/1975 | Toews | B62D 55/26 |
| | | | | | 305/167 |
| 3,972,570 | A | * | 8/1976 | Massieon | B62D 55/28 |
| | | | | | 305/167 |
| 4,021,082 | A | | 5/1977 | Rasmussen | |
| 5,902,017 | A | | 5/1999 | Kurata et al. | |

(Continued)

FOREIGN PATENT DOCUMENTS

| GB | 832121 A | 4/1960 |
| WO | 8303582 A1 | 10/1983 |
| WO | 2014030927 | 2/2014 |

*Primary Examiner* — Kip T Kotter

(57) ABSTRACT

In one aspect, a track shoe assembly may include a shoe plate having a shoe plate body including a shoe plate attachment surface, and at least two slots extending through at least the shoe plate attachment surface. The track shoe assembly may also include a grouser having a grouser body having a grouser attachment surface, and at least two tabs, integrally formed with the grouser body, the at least two tabs extending from the grouser attachment surface, and perpendicular to the grouser attachment surface, the at least two tabs of the grouser being configured to be positioned within the at least two slots of the shoe plate. In another aspect, a method of manufacturing a track shoe assembly may include forming a shoe plate as described above, forming a grouser as described above, and attaching the grouser to the shoe plate to thereby form a track shoe assembly.

20 Claims, 5 Drawing Sheets

(56) References Cited

U.S. PATENT DOCUMENTS

| | | |
|---|---|---|
| 7,377,601 B2 | 5/2008 | Katoh et al. |
| 9,004,618 B1 * | 4/2015 | Delisle .................. B62D 55/32 |
| | | 305/180 |
| 2010/0201187 A1 | 8/2010 | Jacobsen |
| 2016/0236736 A1 * | 8/2016 | Thorson ................. B62D 55/26 |
| 2016/0297487 A1 * | 10/2016 | Thorson ............... B62D 55/205 |

* cited by examiner

TRACK SHOE ASSEMBLY INCLUDING A SHOE PLATE AND A GROUSER AND RELATED METHOD OF MANUFACTURE

TECHNICAL FIELD

Various embodiments of the present disclosure relate generally to a track shoe assembly, including a shoe plate and a grouser, for track-type vehicles and a related method of manufacture.

BACKGROUND

Track-type machines or vehicles, such as crawler-type tractors, may be used on relatively soft terrain to move materials or equipment across the terrain, while providing relatively even distribution of weight of the vehicle. These machines or vehicles include one or more continuous loops, or track assemblies, formed on opposing sides of a given machine or vehicle. The track assemblies are driven by a driving mechanism, such as a machine engine or other port source, via at least one drive gear or sprocket. The track assemblies include a plurality of track plates mounted to an undercarriage assembly, which may include, for example, the sprocket, at least one idler, a plurality of rollers, and any other component of an undercarriage assembly shown in the art. As the rollers rotate using power output by an engine of the vehicle, the belts rotate, and the track plates are laid on the ground, with a grouser of each track plate extending into the terrain. As the rotational force from the rollers is transmitted to the grousers via the belts and the track plates, the vehicle advances, or crawls, forward.

Some track shoes are currently manufactured by rolling a material into 10-meter sections, to a thickness of about 13 mm, and cutting the rolled material to size. That is, the overall width of the track shoes is 10-meters, and each track shoe is cut to predetermined height, depending on the size needed. The relatively large size of the rolled sections makes manufacture of track shoes, and, therefore, grousers, difficult, in part because it limits the locations in which manufacturing can be performed, due to the limited number of facilities capable of rolling materials in such large sizes. As a result of the limited number of facilities and difficulties in working with such large pieces of material, the manufacture of track shoes may be relatively expensive. There is a need, however, for a track shoe for which manufacturing and assembly can be performed in more places and with relatively lower manufacturing costs.

In addition, track shoes have a limited life, due to the frequency with which portions of the track shoes, in particular, the grousers, contact and engage with terrain. Indeed, grousers of track shoes are subject to relatively greater wear than other portions of the track shoes. U.S. Pat. No. 3,972, 570 A, to Massieon, describes a wear-resistant composite track shoe, in which a high wear-resistant insert is bonded into a groove in a contact face of a grouser bar (or a grouser) of a track shoe, in order to extend the useful life of the grouser. The grouser bar may be separately formed from a base plate of the track shoe. In particular, the grouser bar is welded to the base plate using electrically-resistance pressure welding, in which surfaces of the grouser bar and the base plate are softened, melted, and pressed against each other under substantial pressure, to cause molten material to be forced together. Terrain forces acting on grouser bars can strain the welded joint between the grouser bar and the base plate of track shoes like those described in the '570 patent. Moreover, replacement of the grouser bars, rather than the entire track shoe, may require separation of the joint extending along an entire width of the grouser bar and the base plate.

The grouser, track plate assembly, and related method of manufacture of the present disclosure are directed to overcoming one or more of these above-referenced challenges, or other problems in the art.

SUMMARY OF THE DISCLOSURE

In one aspect, a grouser for a track shoe assembly may include a body having an attachment surface, and at least two tabs, integrally formed with the body, the at least two tabs extending from the attachment surface of the body and perpendicular to the attachment surface of the body.

In another aspect, a track shoe assembly may include a shoe plate having a shoe plate body including a shoe plate attachment surface, and at least two slots extending through at least the shoe plate attachment surface. The track shoe assembly may also include a grouser having a grouser body having a grouser attachment surface, and at least two tabs, integrally formed with the grouser body, the at least two tabs extending from the grouser attachment surface, and perpendicular to the grouser attachment surface, the at least two tabs of the grouser being configured to be positioned within the at least two slots of the shoe plate.

In still another aspect, a method of manufacturing a track shoe assembly may include forming a shoe plate having a shoe plate body including a shoe plate attachment surface, and at least two slots extending through at least the shoe plate attachment surface, forming a grouser having a grouser body having a grouser attachment surface, and at least two tabs, integrally formed with the grouser body, the at least two tabs extending from the grouser attachment surface, and perpendicular to the grouser attachment surface, the at least two tabs of the grouser being configured to be positioned within the at least two slots of the shoe plate, and attaching the grouser to the shoe plate to thereby form a track shoe assembly.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprising," "having," including," and any variations thereof, are intended to cover a non-exclusive inclusion, such that a process, method, article, or apparatus that comprises a list of elements does not include only those elements, but may include other elements not expressly listed or inherent to such a process, method, article, or apparatus. In addition, in this disclosure, relative terms, such as, for example, "about," "generally, "substantially," and "approximately" are used to indicate a possible variation of ±10% in the stated value. Further, in this disclosure, references to widths, depths, and lengths provided with respect to various portions and/or surfaces are consistent, i.e., all widths are defined along a Y-axis, all depths are defined along a Z-axis, and all lengths are defined along an X-axis.

Figure 1:
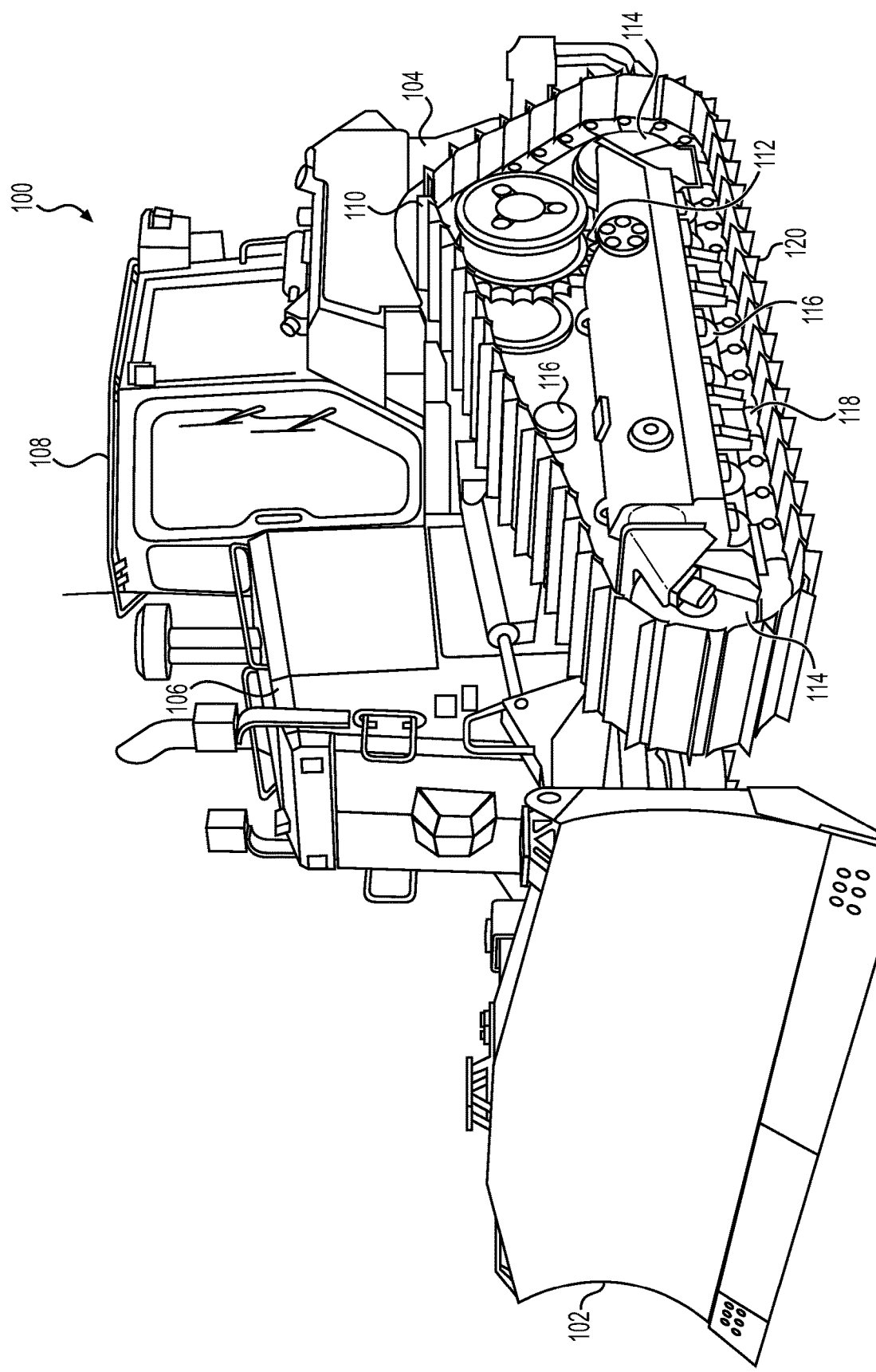
FIG. 1 depicts a schematic view of an exemplary track-type vehicle on which track shoe assemblies, formed in accordance with the embodiments of a track shoe assembly described herein, are installed.

FIG. 1 shows a schematic view of a track-type machine or vehicle 100, specifically, as an example, a track-type tractor, with a blade 102 for moving ground materials, such as soil, stone, debris, etc. The vehicle 100 includes a chassis 104 on which an engine housing 106, containing a machine engine and other components necessary for operation of the vehicle 100, and an operator station 108, in which an operator of the vehicle 100 can perform control and operation of the vehicle 100, are mounted. The vehicle 100 includes one or more track assemblies 110, with the exemplary vehicle 100 of FIG. 1 including two track assemblies 110 (one track on either side of the chassis 104). Each track assembly 110 includes a drive gear or sprocket 112, idlers 114, and rollers 116 that rotate via power output by the engine. The sprocket 112 transmits the power from the engine to the rollers 116. A track chain 118 is mounted around the rollers 116, and a plurality of track shoe assemblies 120 are mounted to the track chain 118.

Figure 2:
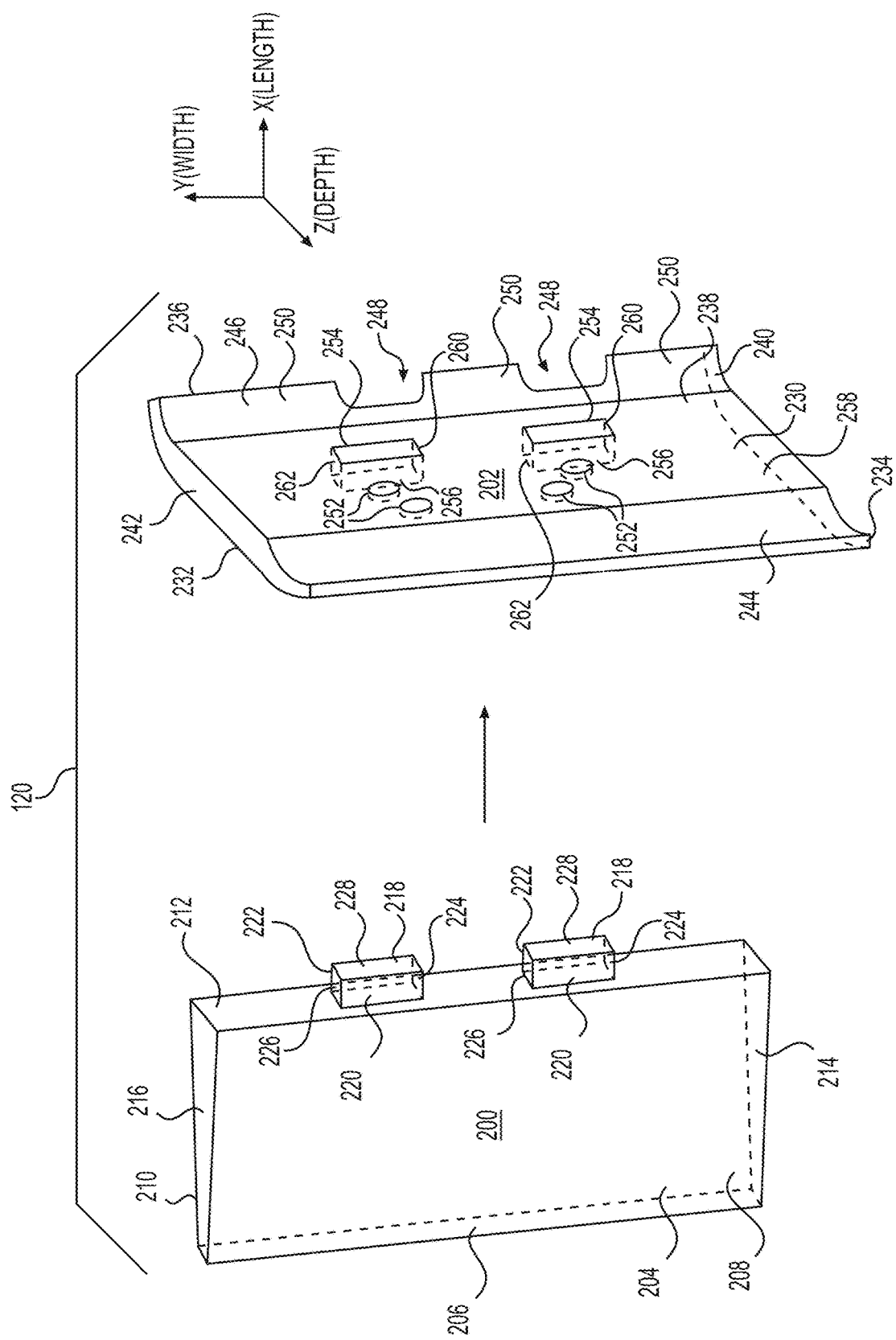
FIG. 2 depicts a schematic view of a grouser and a shoe plate of a track shoe assembly, according to one or more embodiments.
Figure 3:
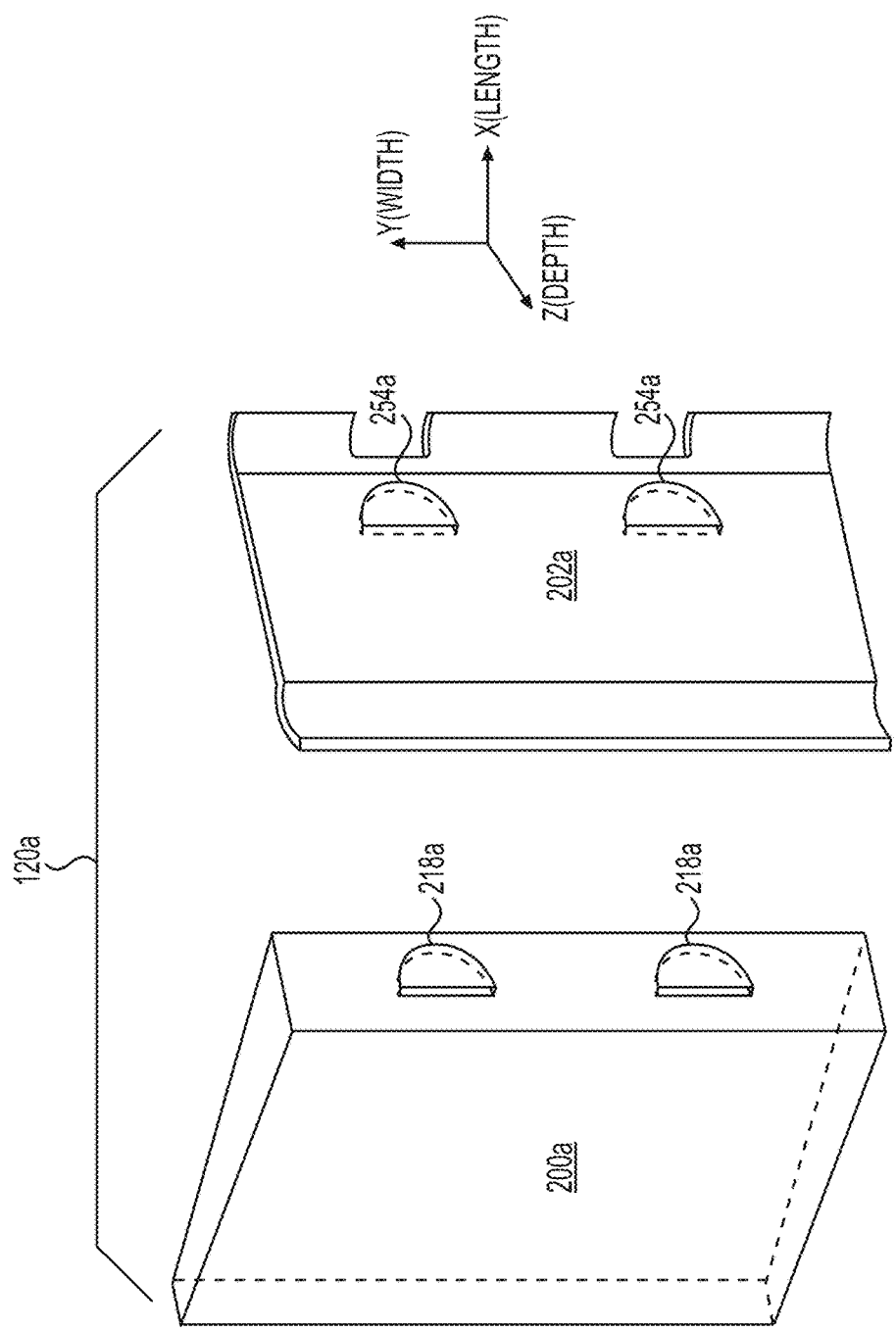
FIG. 3 depicts a schematic view of a grouser and a shoe plate of a track shoe assembly, according to another embodiment.

FIG. 2 shows a schematic view of a track shoe assembly 120, including a grouser 200 and a shoe plate 202, according to one embodiment, and FIG. 3 shows a schematic view of a track shoe assembly 120a, including a grouser 200a and a shoe plate 202a, according to another embodiment. With reference to FIG. 2, the grouser 200 has a grouser body 204 formed as a trapezoidal prism, although the shape of the grouser body 204 is not limited to this shape. The grouser body 204 has a plurality of surfaces, including at least a distal surface 206, configured to contact terrain as the vehicle 100 moves, a front surface 208, a back surface 210, an attachment surface 212, an end surface 214, and another end surface 216. The front surface 208 and the back surface 210 are on intersecting planes, while the distal surface 206 and the attachment surface 212 are opposite to each other, and the end surface 214 and the other end surface 216 are opposite to each other. Put another way, the distal surface 206 and the attachment surface 212 are parallel to each other and to a Z-Y plane, and the end surface 214 and the other end surface 216 are parallel to each other and to an X-Z plane. In addition, the end surface 214 and the other end surface 216 have a trapezoid shape, though the shape of these surfaces is not limited to a trapezoid, and may be any polygon or a shape having one or more curvilinear edges.

The grouser 200 may also include a plurality of tabs 218 extending from the attachment surface 212 of the grouser body 204 in an X-direction, as shown in FIG. 2. In the example shown in FIG. 2, two tabs 218 are provided on the attachment surface 212 of the grouser body 204, although more than two tabs 218 may be provided. Each tab 218 includes a front surface 220, a back surface 222, an end surface 224, another end surface 226, and a proximal surface 228. As shown in FIG. 2, the front surface 220 and the back surface 222 of each tab 218 are parallel to the X-Y plane, the end surface 224 and the other end surface 226 are parallel to the X-Z plane, and the proximal surface 228 is parallel to the Z-Y plane. In addition, the front surface 220 and the back surface 222 of each tab 218 are opposite to each other, and the end surface 224 and the other end surface 226 of each tab 218 are opposite to each other. The tabs 218 shown in FIG. 2 are rectangular in cross section relative to each of the X-Y plane, the Z-Y plane, and the X-Z plane. That is, a cross-sectional shape of the tabs 218 may be a rectangle in each of these noted planes. Specifically, in the Y-Z plane, which is parallel to the attachment surface 212 of the grouser 200, the tabs 218 may have a rectangular cross-sectional shape, as shown in FIG. 2. Alternatively, in the Y-Z plane, the tabs 218a of the grouser 200a may have a semi-circle cross-sectional shape, as shown in FIG. 3. Other cross-sectional shapes for the tabs 218, in the Y-Z plane or otherwise, may be used. Put another way, the two tabs 218 shown in FIG. 2 are shown as rectangular prisms, though the tabs 218 may have another three-dimensional shapes, including the semi-circle shape shown in FIG. 3.

The grouser body 204 may have an overall width, as measured along the Y-axis, of about 0.3 meters to about 1.0 meter, inclusive. The tabs 218 on the attachment surface 212 of the grouser 200 may each have a width, as measured along the Y-axis, of about 0.06 meters to about 0.4 meters, inclusive. The widths of the grouser body 204 and the tabs 218 of the grouser 200 may vary from the ranges of values listed above. And the widths of the tabs 218 may depend upon a relationship between a number of tabs 218 provided on the attachment surface 212 of the grouser body 204 and the width of the grouser body 204. For example, if two tabs 218 are provided on a grouser body 204, a width of each of the two tabs 218 may be greater than a width of tabs 218 in a case in which three or more tabs 218 are provided on the grouser body 204. In addition or alternatively, if two tabs 218 are provided on a grouser body 204 of a given width, e.g., 0.3 meters, a greater number of tabs 218 may be provided on a grouser body 204 having a greater width, e.g., of 1.0 meter.

Similarly, the grouser body 204 may have an overall depth, as measured along the Z-axis, of about 0.019 meters to about 0.05 meters, inclusive. The depth of the tabs 218 may be about 0.015 meters to about 0.04 meters, inclusive. The depths of the grouser body 204 and the tabs 218 of the grouser 200 may vary from the ranges of values listed above. In addition, the depths of the tabs 218 may depend upon a number of tabs 218 provided on the attachment surface 212 of the grouser body 204 and/or the depth of the grouser body 204. For example, if two tabs 218 are provided on a grouser body 204, a depth of each of the two tabs 218 may be greater than or less than a depth of tabs 218 in a case in which three or more tabs 218 are provided on the grouser 200. In addition or alternatively, if two tabs 218 are provided on a grouser body 204 of a given depth, e.g., 0.019 meters, a greater number of tabs 218 may be provided on a grouser body 204 having a greater depth, e.g., of 0.05 meters.

Further, the grouser body 204 may have an overall length, measured along the X-axis, of about 0.047 meters to about 0.12 meters, inclusive. The length of the tabs 218 may be about 0.008 meters to about 0.024 meters, inclusive. The lengths of the grouser body 204 and the tabs 218 may depend upon the number of tabs 218 provided on the attachment surface 212 of the grouser body 204, and the length of the grouser body 202. For example, if two tabs 218 are provided on a grouser 200 having a length of about 0.12 meters, a length of each of the two tabs 218 may be greater than or less than a length of tabs 218 in a case in which three or more tabs 218 are provided on the grouser 200.

As shown in FIG. 2, the shoe plate 202 of the track shoe assembly 120 has a shoe plate body 230 formed generally as a rectangular prism, although the shape of the shoe plate body 230 is not limited to this shape. The shoe plate body 230 has a plurality of surfaces, including at least an attachment surface 232, a front surface 234, a back surface 236, a proximal surface 238, an end surface 240, and another end surface 242. The attachment surface 232 and the proximal surface 238 are opposite to each other, and the end surface 240 and the other end surface 242 are opposite to each other. Put another way, with reference to the axes identified in FIG. 2, the attachment surface 232 and the proximal surface 238 are parallel to each other and to a Z-Y plane and the end surface 240 and the other end surface 242 are parallel to each other and to an X-Z plane.

The shoe plate body 230 may also include one curved portion 244 adjacent to the front surface 234, and another curved portion 246 adjacent to the back surface 236. The curved portions 244 and 246 are defined by curves on the attachment surface 232 and the proximal surface 238, as shown in FIG. 2. The front surface 234 and the back surface 236 are not parallel to each other in the embodiment shown in FIG. 2, as they are ends of the curved portions 244 and 246. The other curved portion 246, adjacent to the back surface 236, may also have at least one recess 248, defined by at least two tabs 250. In the embodiment shown in FIG. 2, the curved portion 246 includes two recesses 248, defined by three tabs 250, although the shoe plate body 230 may have a greater or lesser number of recesses 248 and tabs 250. The shoe plate body 230 may also include one or more through holes 252 that extend through the attachment surface 232 and the proximal surface 238, as shown in FIG. 2. In the embodiment shown in FIG. 2, four through holes 252 are provided, although the shoe plate body may have a greater or lesser number of through holes 252. The through holes 252 may be used, for example, to attach the track shoe assembly 120 to the track chain 118 to form the track assembly 110. The shoe plate 230 body is not limited to the shape shown in FIG. 2, however, and the attachment surface 232 and the proximal surface 238 may be straight or flat surfaces, and, in such an alternative embodiment, the back surface 236 may be opposite to the front surface 234.

The shoe plate 202 may also include a plurality of slots 254 extending at least through the attachment surface 232 of the shoe plate body 230 in an X-direction, as shown in FIG. 2. In the example shown in FIG. 2, two slots 254 are provided on the attachment surface 232 of the shoe plate body 230, corresponding to the two tabs 218 extending from the attachment surface 212 of the grouser body 204, although more than two slots 254 may be provided to correspond to more than two tabs 218, or one slot 254 may be provided to correspond to one tab 218. Each slot 254 is defined by at least a front surface 256, a back surface 258, an end surface 260, and another end surface 262. As shown in FIG. 2, the front surface 256 and the back surface 258 defining each slot 254 are parallel to the X-Y plane, and the end surface 260 and the other end surface 262 defining each slot 254 are parallel to the X-Z plane. In addition, the front surface 256 and the back surface 258 defining each slot 254 are opposite to each other, and the end surface 260 and the other end surface 262 defining each slot 254 are opposite to each other. The slots 254 shown in FIG. 2 are rectangular in cross section relative to each of the X-Y plane, the Z-Y plane, and the X-Z plane. That is, a cross-sectional shape of the slots 254 may be a rectangle in each of these noted planes. Specifically, in the Y-Z plane, which is parallel to the attachment surface 232 of the shoe plate 202, the slots 254 may have a rectangular cross-sectional shape to match the shape of the tabs 218 of the grouser 200, in the same plane, as shown in FIG. 2. Alternatively, in the Y-Z plane, the slots 254*a* of the shoe plate 202*a* may have a semi-circle cross-sectional shape, to match a corresponding shape of the tabs 218*a* of the grouser 200*a*, in the same plane, as shown in FIG. 3. Other cross-sectional shapes for the slots 254 and corresponding tabs 218, in the X-Y plane or otherwise, may be used. The tabs 218 and the slots 254 may have any one of a variety of cross-sectional shapes, including, for example, circles, ovals, triangles, trapezoids, hexagons, among others. In addition, the surfaces of the tabs 218 and the slots 254 may be curved, planar, or a combination thereof, and may have a varied shape in the form of a pattern, for example. The surfaces of the tabs 218 and the slots 254 may also be asymmetric so that a particular surface of the grouser 200 may be properly positioned when installed on the shoe plate 202. Still further, the tabs 218 may be provided on the shoe plate 202, and the slots 254 may be provided on the grouser 200, with the respective surfaces of the tabs 218 and the slots 254 having any one of the shapes or configurations described above.

The shoe plate body 230 may have an overall width, as measured along the Y-axis, of about 0.3 meters to about 1.0 meter, inclusive. The slots 254 on the attachment surface 232 of the shoe plate 202 may each have a width, as measured along the Y-axis, of about 0.06 meters to about 0.4 meters, inclusive. The widths of the shoe plate body 230 and the slots 254 of the shoe plate 202 may vary from the ranges of values listed above. And, similar to the tabs 218 and the grouser body 204, the widths of the slots 254 may depend upon a number of slots 254 provided on the attachment surface 232 of the shoe plate 202 and/or the width of the shoe plate body 230. For example, if two slots 254 are provided on a shoe plate body 230, a width of each of the two slots 254 may be greater than a width of slots 254 in a case in which three or more slots 254 are provided on the shoe plate body 230. In addition or alternatively, if two slots 254 are provided on a shoe plate body 230 of a given width, e.g., 0.3 meters, a greater number of slots 254 may be provided on a shoe plate body 230 having a greater width, e.g., of 1.0 meter.

The shoe plate body 230 may have an overall depth, as measured along the Z-axis, of about 0.18 meters to about 0.37 meters, inclusive. The slots 254 on the attachment surface 232 of the shoe plate body 230 may each have a depth, as measured along the Z-axis, of about 0.015 meters to about 0.04 meters, inclusive. The depths of the shoe plate body 230 and the slots 254 may vary from the ranges listed above. And, similar to the tabs 218 and the grouser body 204, the depths of the slots 254 may depend upon a relationship between a number of slots 254 provided on the attachment surface 232 of the shoe plate 202 and/or the depth of the shoe plate body 230. For example, if two slots 254 are provided on a shoe plate body 230 with a depth of about 0.37 meters, a depth of each of the two slots 254 may be greater than a depth of slots 254 in a case in which three or more slots 254 are provided on the shoe plate body 230. In addition or alternatively, if two slots 254 are provided on a shoe plate body 230 of a given depth, e.g., 0.018 meters, a greater number of slots 254 may be provided on a shoe plate body 230 having a greater depth, e.g., of 0.37 meters.

Further, the shoe plate body 230 may have an overall length, as measured along the X-axis, of about 0.008 meters to about 0.024 meters, inclusive. The slots 254 may each have a length, measured along the X-axis, of about 0.008 meters to about 0.024 meters, inclusive. The lengths of the shoe plate body 230 and of the slots 254 may vary from the ranges of values listed above. The length of the slots 254 may also vary depending on the relationship between the sizes, and in particular, the lengths, of the shoe plate body 230 and the number of slots 254. Further, a depth and a width of each of the at least two tabs 218 of the grouser 200, in a plane parallel to the grouser attachment surface 212, that is, in the Z-Y plane, may be slightly less than a depth and a width, respectively, of each of the corresponding at least two slots 254 of the shoe plate 202, in a plane parallel to the shoe plate attachment surface 232, that is, in the Z-Y plane, to thereby form an interference fit. Specifically, each of the combined depths and widths of the tabs 218 may be equal to 20% to 40% of the overall depth and width, respectively, of the grouser body 204, and each of the combined depths and widths of the slots 254 may be 20% to 40% of the overall depth and width, respectively, of the shoe plate body 230. In addition, a length of each of the at least two tabs 218 of the grouser 200 may be equal to a length of the correspondence at least two slots 254 of the shoe plate 202, so that the proximal surface 228 of the tabs 218 is flush with the proximal surface 238 of the shoe plate 202. By virtue of this relationship between the dimensions of the tabs 218 and the slots 254, it is possible to ensure a proper fit between the tabs 218 and slots 254 during the process of manufacturing the track shoe assembly 120, discussed in more detail with reference to FIG. 5, below.

Figure 4:
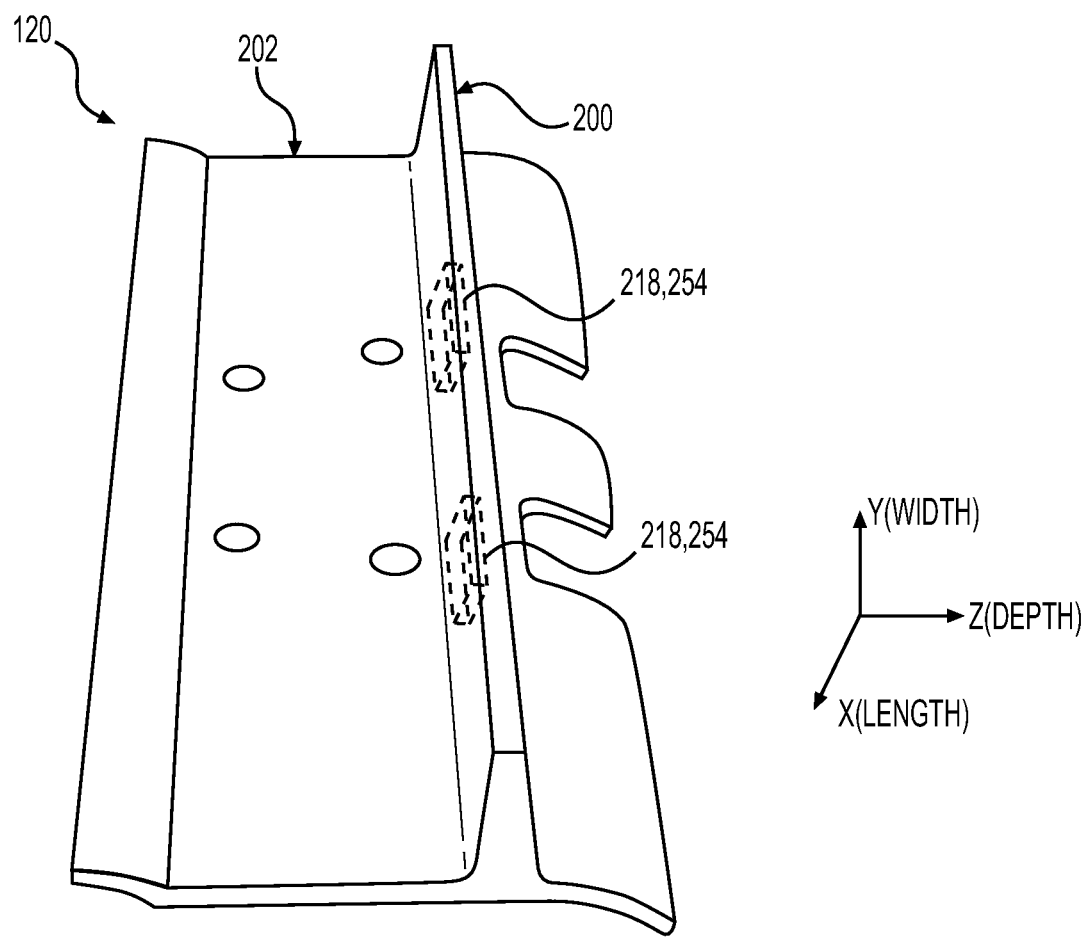
FIG. 4 depicts a schematic view of track shoe assembly, according to one or more embodiments.

FIG. 4 depicts a track shoe assembly 120, with the grouser 200 and the shoe plate 202 attached to each other. Specifically, the tabs 218 of the grouser 200 are configured to be inserted into the slots 254 of the shoe plate 202, as shown in dashed lines in FIG. 2. The grouser 202 and the shoe plate 202 are configured to be securely attached to each other by welding, for example, as discussed in more detail with reference to FIG. 5, below. In particular, with reference to FIG. 2, the front surface 220, the back surface 222, the end surface 224, and the other end surface 226 of each tab 218 of the grouser 200 are configured to contact and be welded to a front surface 256, a back surface 258, an end surface 260, and another end surface 262, respectively, defining a corresponding slot 254 in the shoe plate 202. Alternatively, contact and/or welding may be made between a subset of these surfaces. In addition, when the grouser 200 and the shoe plate 202 are attached to each other, the attachment surface 212 of the grouser 200, shown in FIG. 2, contacts the attachment surface 232 of the shoe plate 202. The grouser 200 extends outward from the attachment surface 232 of the shoe plate 202, so that, when the track shoe assembly 120 is mounted on the track chain 118 of the track assembly 110, shown in FIG. 1, the grouser 200 extends in a direction that is normal to a plane of the track chain 118 at the point on the track chain 118 where the track shoe 120 is attached. That is, the grouser 200 extends outward from the track chain 118 at all positions along the track chain 118 on which a track shoe assembly 120 is installed.

Industrial Applicability

The grouser 200 of the present disclosure provides an easily replaceable component for a track shoe assembly 120 of a track assembly 110 of a track-type vehicle 100, such as the track-type tractor shown in FIG. 1. Specifically, because the grouser 200 can be formed separately from the shoe plate 202, and subsequently joined using tabs 218 and slots 254, and welding to form a secure connection between the grouser 200 and the shoe plate 202, it is possible to manufacture the grouser 200, and, therefore, the shoe plate 202 in a relatively greater number of manufacturing facilities, as compared to the limited number of facilities capable of manufacturing the rolled larger sections of material to integrally form track shoes, as discussed in the Background of the Invention section of this disclosure. And, as a result, the costs associated with manufacture and distribution of grouser 200 and shoe plates 202, either as separate components or as assembled track shoe assemblies 120, formed in accordance with the invention, may be relatively lower, due to reduced distance and time of transit.

Further, the grouser 200 and the shoe plate 202 can be assembled either before or after distribution or delivery thereof, and at any point in between. Advantageously, by virtue of the track shoe assembly 120 of the present disclosure, a grouser 200 and a shoe plate 202 can be separately formed and assembled upon delivery at an end point in distribution or on a work site. This may allow for reduced transit time and/or may allow for use of a wider range of delivery vehicles, particularly with regard to size, for delivery of the grouser 200 and the shoe plate 202. In addition, a grouser 200 may be removed and replaced with relatively less time and effort, due to the relatively smaller area of attachment between the grouser 200 and the shoe plate 202, as compared to the device described in the '570 patent. That is, because attachment of the grouser 200 and the shoe plate 202 can be limited to the front surface 220, the back surface 222, the end surface 224, and the other end surface 226 of the tabs 218 and the corresponding surfaces defining the slots 254, as described above, the entirety of the attachment surface 212 of the grouser 200 need not be attached to the shoe plate 202, thus reducing time and amount of energy required to remove and replace a grouser 200. More specifically, because welding is needed only on surfaces between the tabs 218 of the grouser 200 and the slots 254 of the shoe plate 202, as described above, the amount of time and material needed to attach a grouser 200 to a shoe plate 200 using welding are relatively low.

Figure 5:
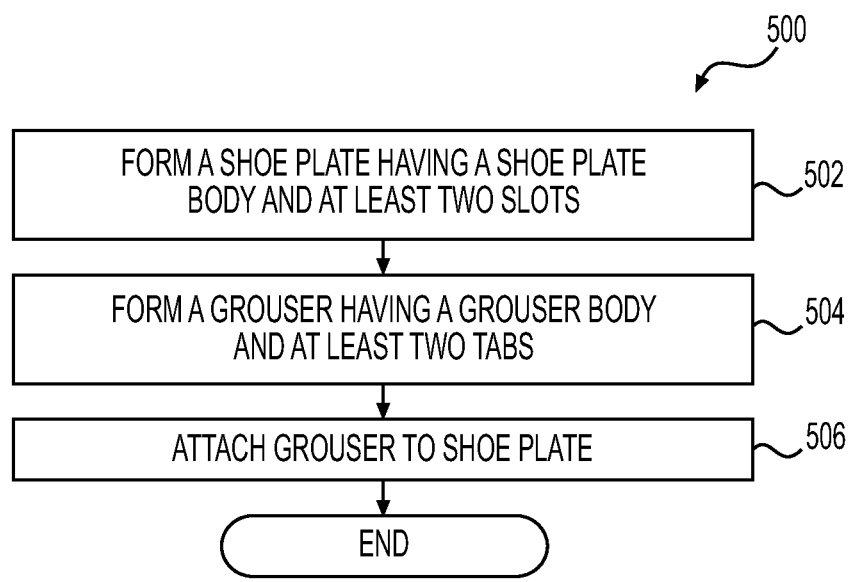
FIG. 5 depicts a flowchart of a method of forming a track shoe assembly, according to one or more embodiments.

FIG. 5 depicts a flowchart of a method 500 of forming a track shoe assembly, such as the track shoe assembly 120 shown in FIGS. 1 to 3, according to one or more embodiments. The method 500 may include, for example, a step 502 of forming a shoe plate 202 having a shoe plate body 230 including a shoe plate attachment surface 232, and at least two slots 254 extending through at least the shoe plate attachment surface 232. The shoe plate body 230 and the at least two slots 254 may be formed in accordance with the foregoing description of the shoe plate body 230 and the at least two slots 254, as shown in FIGS. 2 and 3. In addition, the method 500 may include a step 504 of forming a grouser 200 having a grouser body 204 having a grouser attachment surface 212, and at least two tabs 218, integrally formed with the grouser body 204, the at least two tabs 218 extending from the grouser attachment surface 212, and perpendicular to the grouser attachment surface 212. The at least two tabs 218 of the grouser 200 may also be configured to be positioned within the at least two slots 254 of the shoe plate 202. Finally, the method 500 may include a step 506 of attaching the grouser 200 to the shoe plate 202. Although the method 500 is described as including steps 502 to 506, noted above, the method 500 is not limited to these steps.

In addition, one or more of the following steps may be included as part of the method 500. Attaching the grouser 200 to the shoe plate 202 may include positioning the at least two tabs 218 of the grouser 200 within the at least two slots 254 of the shoe plate 202, and welding the at least two tabs 218 of the grouser 200 and the at least two slots 254 of the shoe plate 202 together. Further, welding may include one of arc welding, friction welding, and plug welding. Other types of welding may, however, be performed as part of the attaching step of the method 500.

Further, forming the grouser 200 may include rolling a material to form the grouser body 204, and trimming the grouser body 204 to form the grouser attachment surface 212 and the at least two tabs 218 thereon. Also, forming the shoe plate 202 may include rolling a material to form the shoe plate body 230 and punching holes in the shoe plate body 230 to form the at least two slots 254.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A grouser for a track shoe assembly, the grouser comprising:
   a body having an attachment surface, a distal surface opposite and parallel to the attachment surface, a first end surface, a second end surface opposite to the first end surface, a front surface, and a back surface opposite to the front surface, wherein a plane of the front surface intersects a plane of the back surface, and the distal surface extends between the front surface and the back surface; and
   at least two tabs, integrally formed with the body, the at least two tabs extending from the attachment surface of the body and perpendicular to the attachment surface of the body,
   wherein the attachment surface defines a substantially planar continuous surface from a first tab of the at least two tabs to a second tab of the at least two tabs.

2. The grouser according to claim 1, wherein a cross-sectional shape of each of the at least two tabs, in a plane parallel to the attachment surface, is a rectangle.

3. The grouser according to claim 1, wherein a cross-sectional shape of each of the at least two tabs, in a plane perpendicular to the attachment surface, is a semicircle.

4. The grouser according to claim 1, wherein a width of the grouser is in a range of about 0.3 meters and about 1.0 meters.

5. A track shoe assembly comprising:
   a shoe plate having:
      a shoe plate body including a shoe plate attachment surface; and
      at least two slots extending through at least the shoe plate attachment surface; and
   a grouser having:
      a grouser body having a grouser attachment surface, a grouser distal surface opposite to the grouser attachment surface, a front surface, a back surface opposite to the front surface, a first end surface, and a second end surface, wherein a cross-sectional shape of each of the first end surface and the second end surface in a plane parallel to the first end surface and the second end surface, is a trapezoid; and
      at least two tabs, integrally formed with the grouser body, the at least two tabs extending from the grouser attachment surface, and perpendicular to the grouser attachment surface, the at least two tabs of the grouser being configured to be positioned within the at least two slots of the shoe plate,
   wherein the grouser attachment surface defines a substantially planar continuous surface from a first tab of the at least two tabs to a second tab of the at least two tabs.

6. The track shoe assembly according to claim 5, wherein a cross-sectional shape of each of the at least two tabs, in a plane parallel to the grouser attachment surface, is a rectangle.

7. The track shoe assembly according to claim 5, wherein a cross-sectional shape of each of the at least two tabs, in a plane parallel to the grouser attachment surface, is a semicircle.

8. The track shoe assembly according to claim 5, wherein a cross-sectional shape of each of the at least two slots, in a plane parallel to the shoe plate attachment surface, is a rectangle.

9. The track shoe assembly according to claim 5, wherein a cross-sectional shape of each of the at least two slots, in a plane parallel to the shoe plate attachment surface, and a cross-sectional shape of the at least two tabs, in a plane parallel to the grouser attachment surface, is the same.

10. The track shoe assembly according to claim 5, wherein a width of the grouser is in a range of about 0.3 meters and about 1.0 meters.

11. The track shoe assembly according to claim 5, wherein the at least two tabs of the grouser are welded to the at least two slots of the shoe plate.

12. A method of manufacturing a track shoe assembly, the method comprising:
    forming a shoe plate having:
       a shoe plate body including a shoe plate attachment surface; and
       at least two slots extending through at least the shoe plate attachment surface;
    forming a grouser having:
       a grouser body having a grouser attachment surface, a grouser distal surface opposite and parallel to the grouser attachment surface, a first grouser end surface, a second grouser end surface opposite to the first grouser end surface, a front grouser surface, and a back grouser surface opposite to the front grouser surface, wherein a plane of the front grouser surface intersects a plane of the back grouser surface, and the distal grouser surface extends between the front grouser surface and the back grouser surface; and
       at least two tabs, integrally formed with the grouser body, the at least two tabs extending from the grouser attachment surface, and perpendicular to the grouser attachment surface, the at least two tabs of the grouser being configured to be positioned within the at least two slots of the shoe plate,
    wherein the grouser attachment surface defines a substantially planar continuous surface from a first tab of the at least two tabs to a second tab of the at least two tabs; and
    attaching the grouser to the shoe plate to thereby form a track shoe assembly.

13. The method according to claim 12, wherein attaching the grouser to the shoe plate includes:
    positioning the at least two tabs of the grouser within the at least two slots of the shoe plate; and
    welding the at least two tabs of the grouser and the at least two slots of the shoe plate together.

14. The method according to claim 13, wherein welding includes one of arc welding, friction welding, and plug welding.

15. The method according to claim 12, wherein forming the grouser includes:
   rolling a material to form the grouser body; and
   trimming the grouser body to form the grouser attachment surface and the at least two tabs thereon.

16. The method according to claim 12, wherein forming the shoe plate includes:
   rolling a material to form the shoe plate body; and
   punching holes in the shoe plate body to form the at least two slots.

17. The method according to claim 12, wherein a cross-sectional shape of each of the at least two tabs, in a plane parallel to the grouser attachment surface, is a rectangle.

18. The method according to claim 12, wherein a cross-sectional shape of each of the at least two tabs, in a plane parallel to the grouser attachment surface, is a semicircle.

19. The method according to claim 12, wherein a cross-sectional shape of each of the at least two slots, in a plane parallel to the shoe plate attachment surface, is a rectangle.

20. The method according to claim 12, wherein a cross-sectional shape of each of the at least two slots, in a plane parallel to the shoe plate attachment surface, and a cross-sectional shape of the at least two tabs, in a plane parallel to the grouser attachment surface, is the same.

* * * * *